NIKE MOTION GENERATOR
Filed July 8, 1963 10 Sheets-Sheet 1
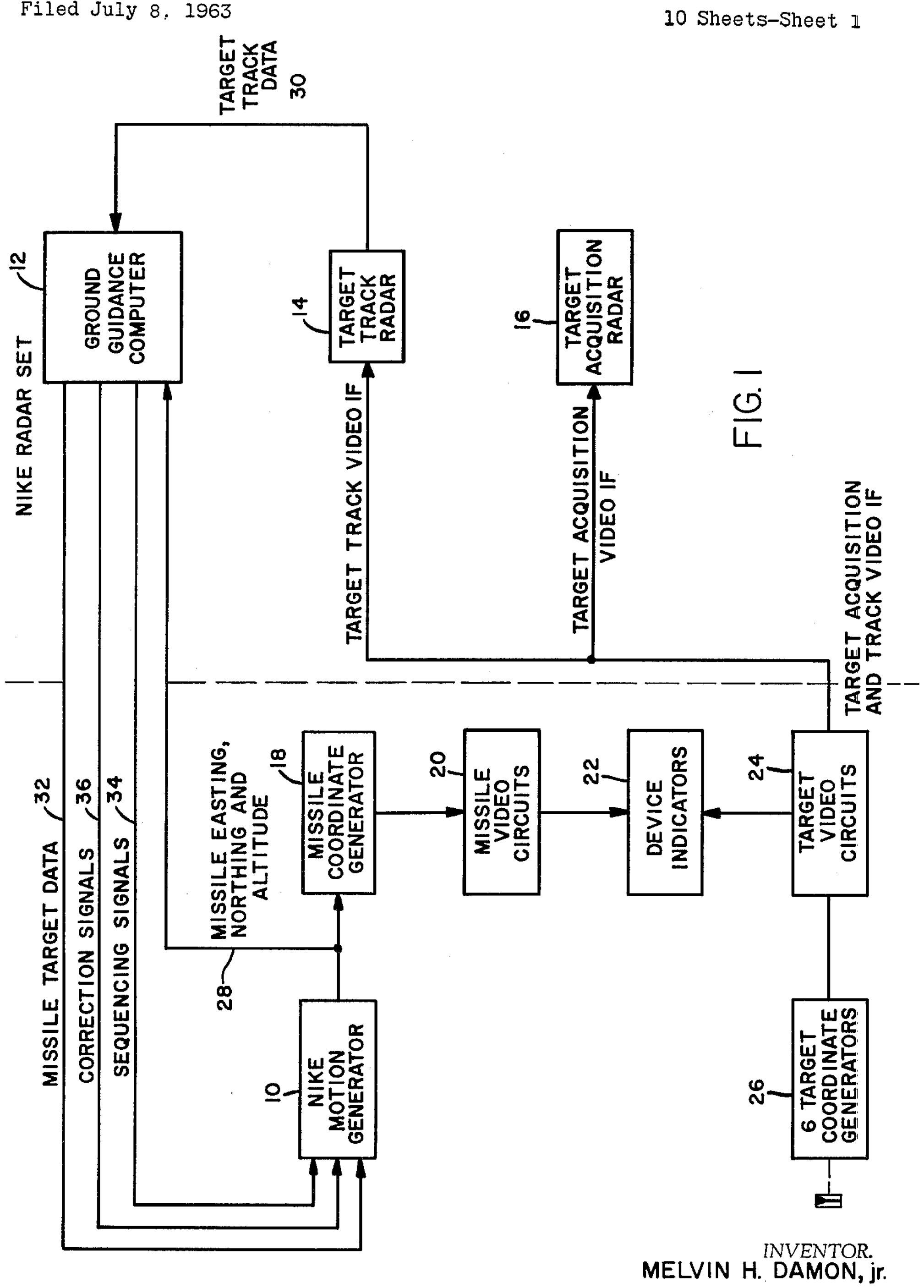
FIG. I
INVENTOR.
MELVIN H. DAMON, jr.
BY
Laurence S. Epstein
ATTORNEYS INVENTOR.
MELVIN H. DAMON, jr.
BY
Laurence S. Epstein
ATTORNEYS INVENTOR.
MELVIN H. DAMON, jr.
BY
Laurence S. Epstein
ATTORNEYS INVENTOR.
MELVIN H. DAMON, jr.
BY
Laurence S. Epstein
ATTORNEYS INVENTOR.
MELVIN H. DAMON, jr.
BY
Laurence S. Epstein
ATTORNEYS INVENTOR.
MELVIN H. DAMON, jr.
BY
Laurence S. Epstein
ATTORNEYS INVENTOR.
MELVIN H. DAMON, jr.
BY
Laurence S. Epstein
ATTORNEYS INVENTOR.
MELVIN H. DAMON, jr.
BY
Laurence S. Epstein
ATTORNEYS $\dot{R}_M$-MISSILE GROUND RANGE VELOCITY
$\dot{Y}_M$-MISSILE NORTHING VELOCITY IN GROUND PLANE
$\dot{X}_M$-MISSILE EASTING VELOCITY IN GROUND PLANE

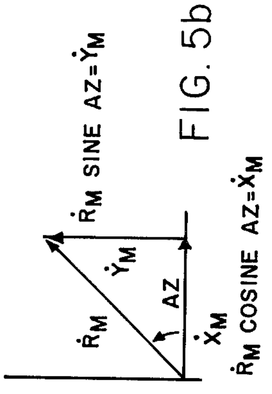

FIG. 5b

X/T-MISSILE-TARGET EASTING CLOSING VELOCITY
Y/T-MISSILE-TARGET NORTHING CLOSING VELOCITY
R/T-MISSILE-TARGET GROUND RANGE CLOSING VELOCITY
AZ-MISSILE-TARGET AZIMUTH ANGLE

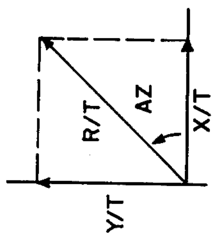

FIG. 5a

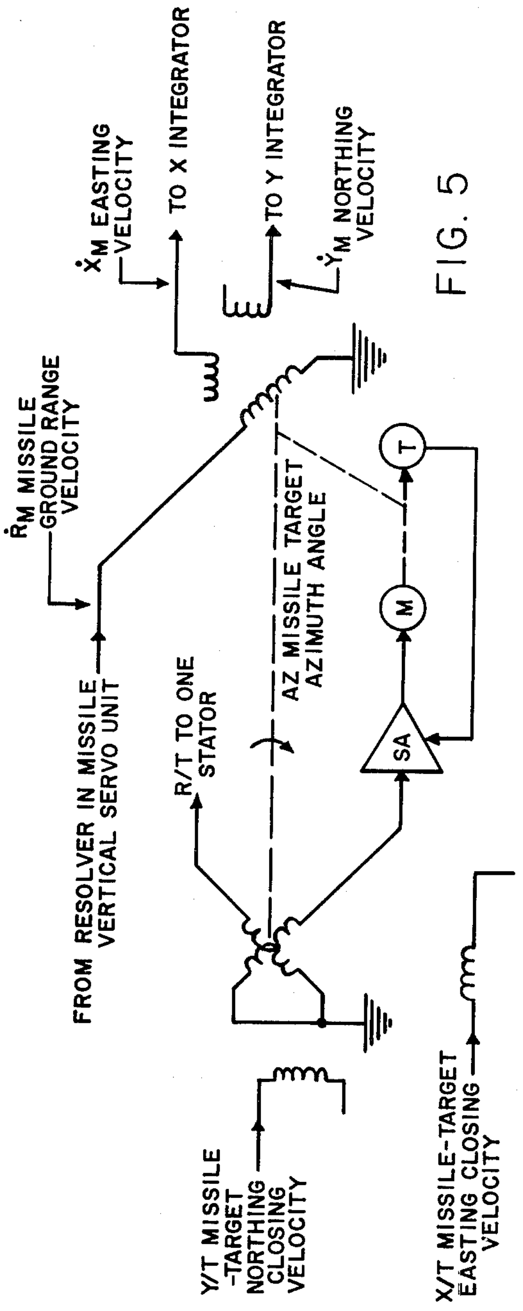

FIG. 5

INVENTOR.
MELVIN H. DAMON, jr.
BY
Laurence S. Epstein
ATTORNEYS

July 26, 1966 M. H. DAMON, JR 3,263,017

NIKE MOTION GENERATOR

Filed July 8, 1963 10 Sheets-Sheet 10

INVENTOR.
MELVIN H. DAMON, jr.

BY

Laurence S. Epstein
ATTORNEYS 3,263,017
NIKE MOTION GENERATOR
Melvin H. Damon, Jr., Wayne, N.J., assignor, by mesne assignments, to the United States of America as represented by the Secretary of the Navy
Filed July 8, 1963, Ser. No. 293,568
4 Claims. (Cl. 35—10.4)

The present invention relates to a novel and improved apparatus for simulating the motions of a Nike missile and is particularly directed towards simulating such Nike missile motions for the purposes of training personnel in the operation and control of radar tracking systems.

In radar tracking systems of the type with which the present invention is concerned target courses are generated as electrical signals. These target courses are made to simulate one or more different targets representative of the type of aircraft which might be encountered by the radar operating personnel. Target equipment previously used for generating targets, contained complex mechanisms which generated electronic or mechanical signals representative of the flight path of an aircraft in a preplanned program. The instant invention simulates the flight path of a Nike missile through all of its phases of operation whereas the previously used flight path simulators only generated a single flight path with no deviations.

It is therefore an object of the instant invention to provide a novel target generator for generating signals simulative of a missile path during operation.

A further object of the instant invention is to provide a novel apparatus which is simple and inexpensive to build for generation of electronic and mechanical signals simulative of a missile of the Nike type during its operation.

Another object of the instant invention is to provide a novel improved apparatus for simulating the flight path of a missile during operation including on-trajectory signals, burst signals and target kill signals.

Still another object of the instant invention is to provide a new and improved target simulation apparatus which produces signals simulative of the flight path of a missile during operation and computes the effectiveness of said missile utilizing externally generated signals.

Figure 2A:
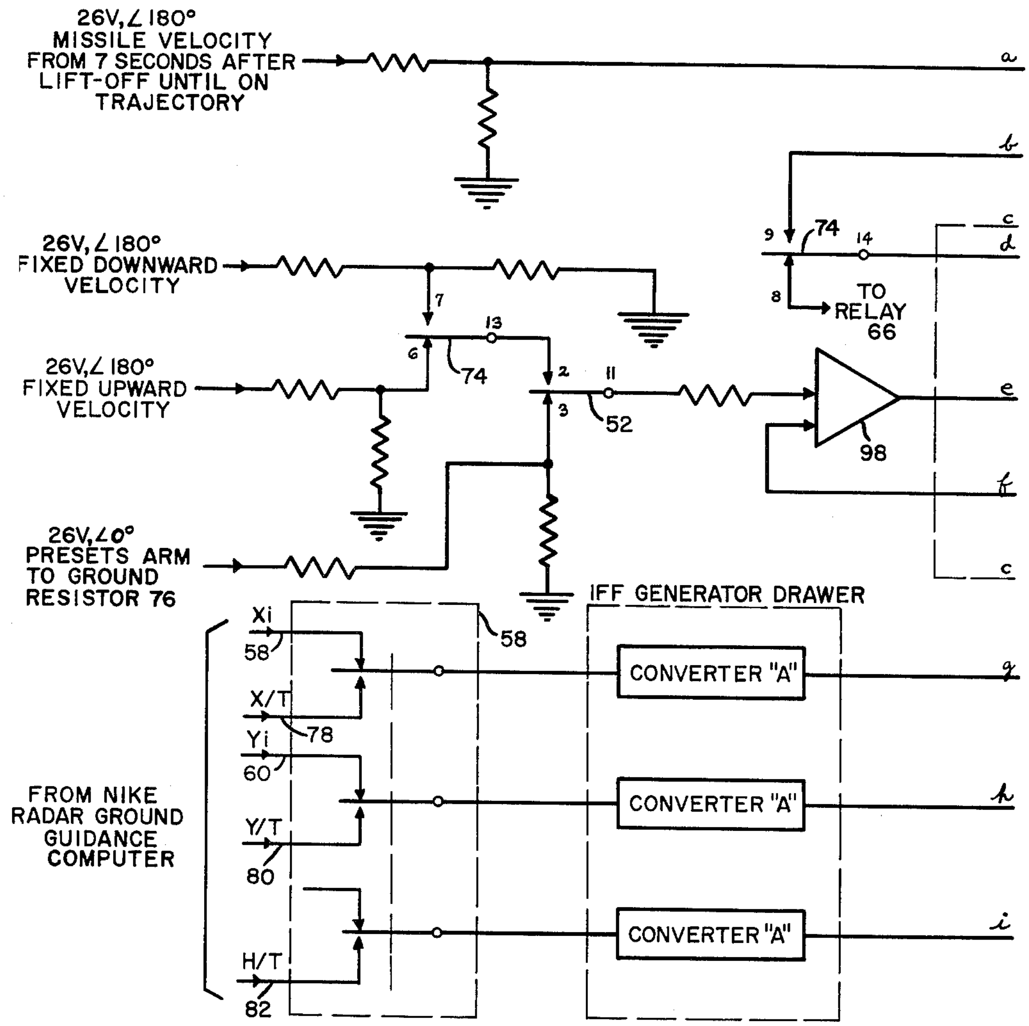
Figure 2B:
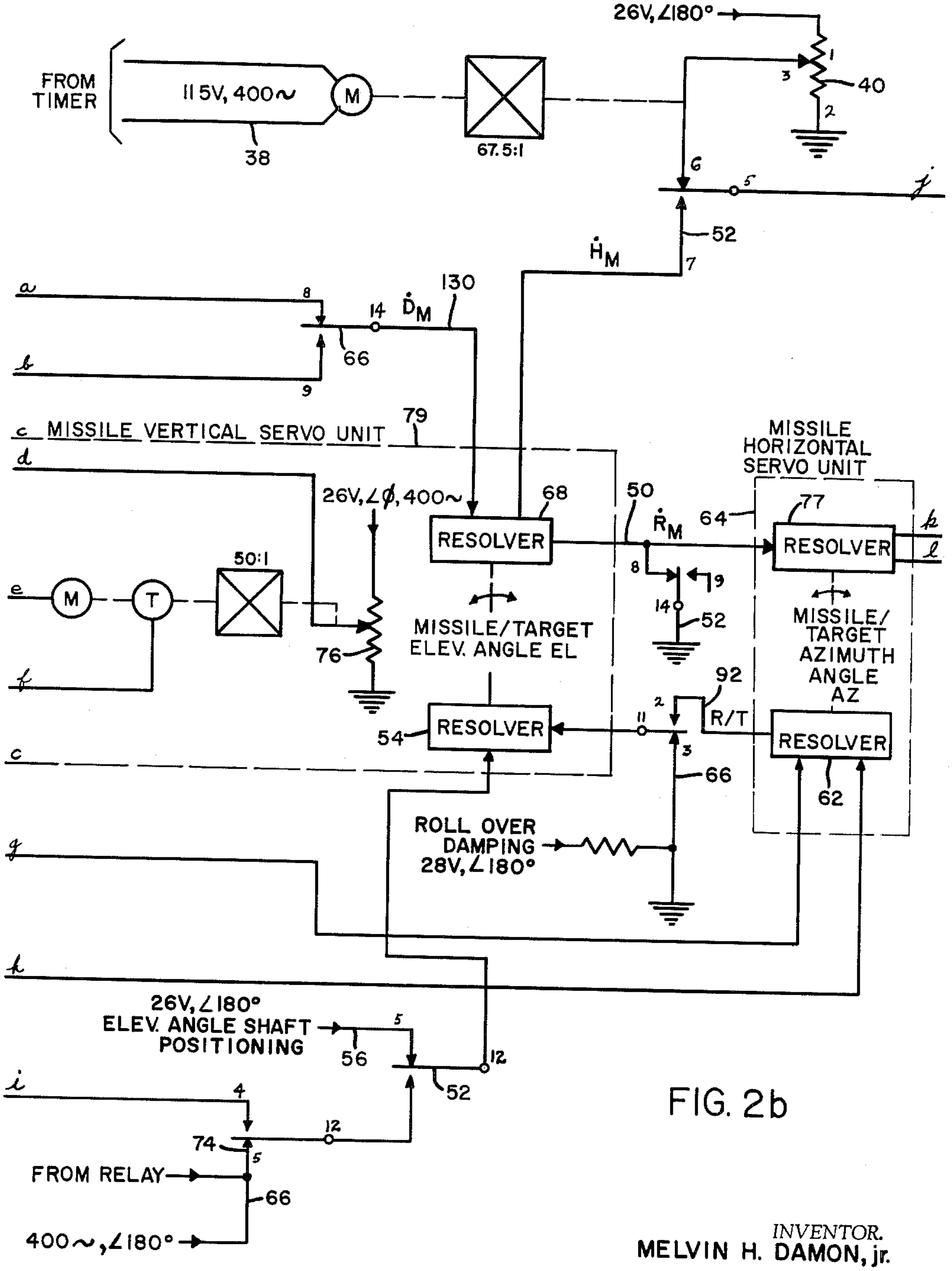
Figure 2C:
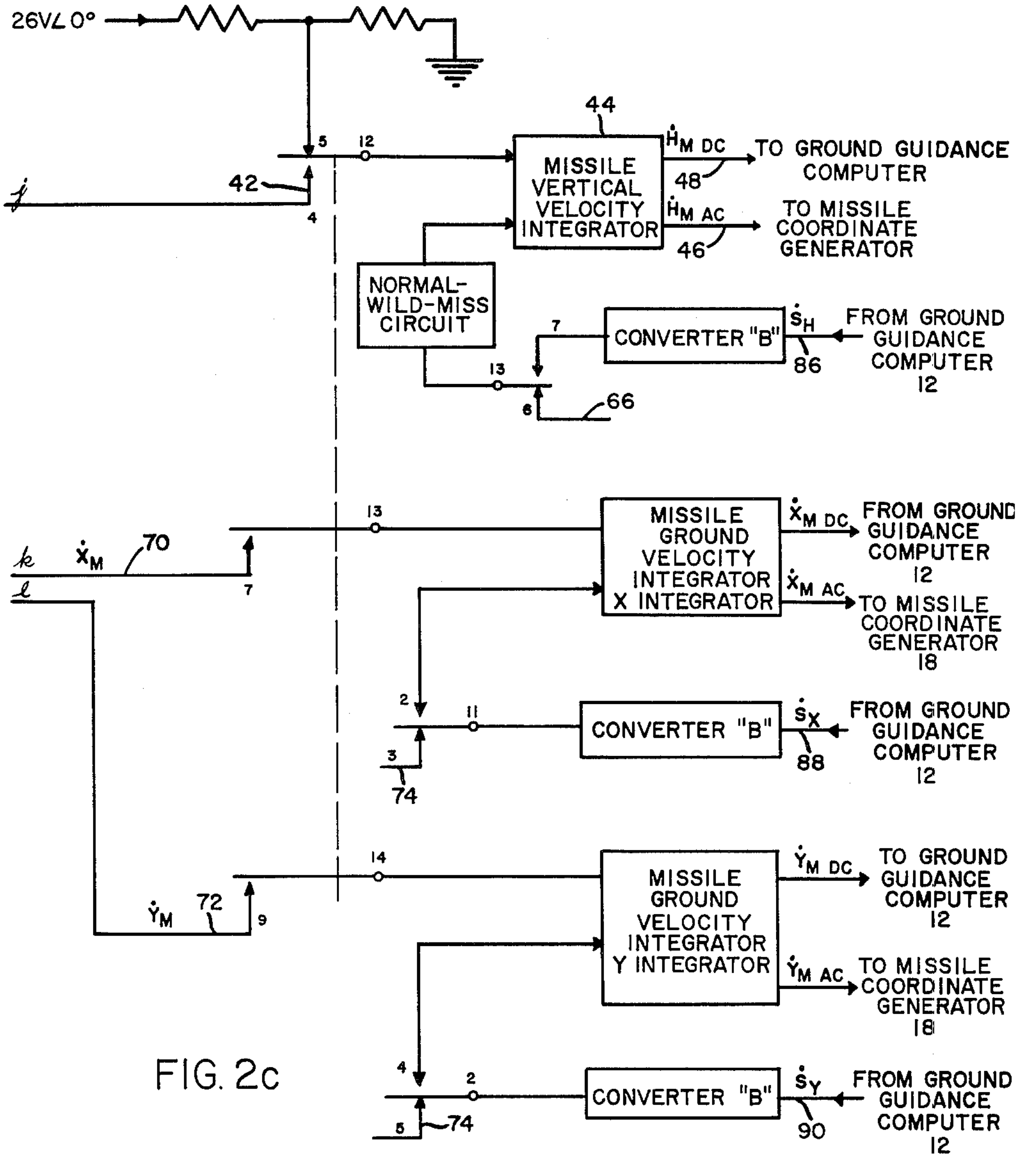
Figure 3A:
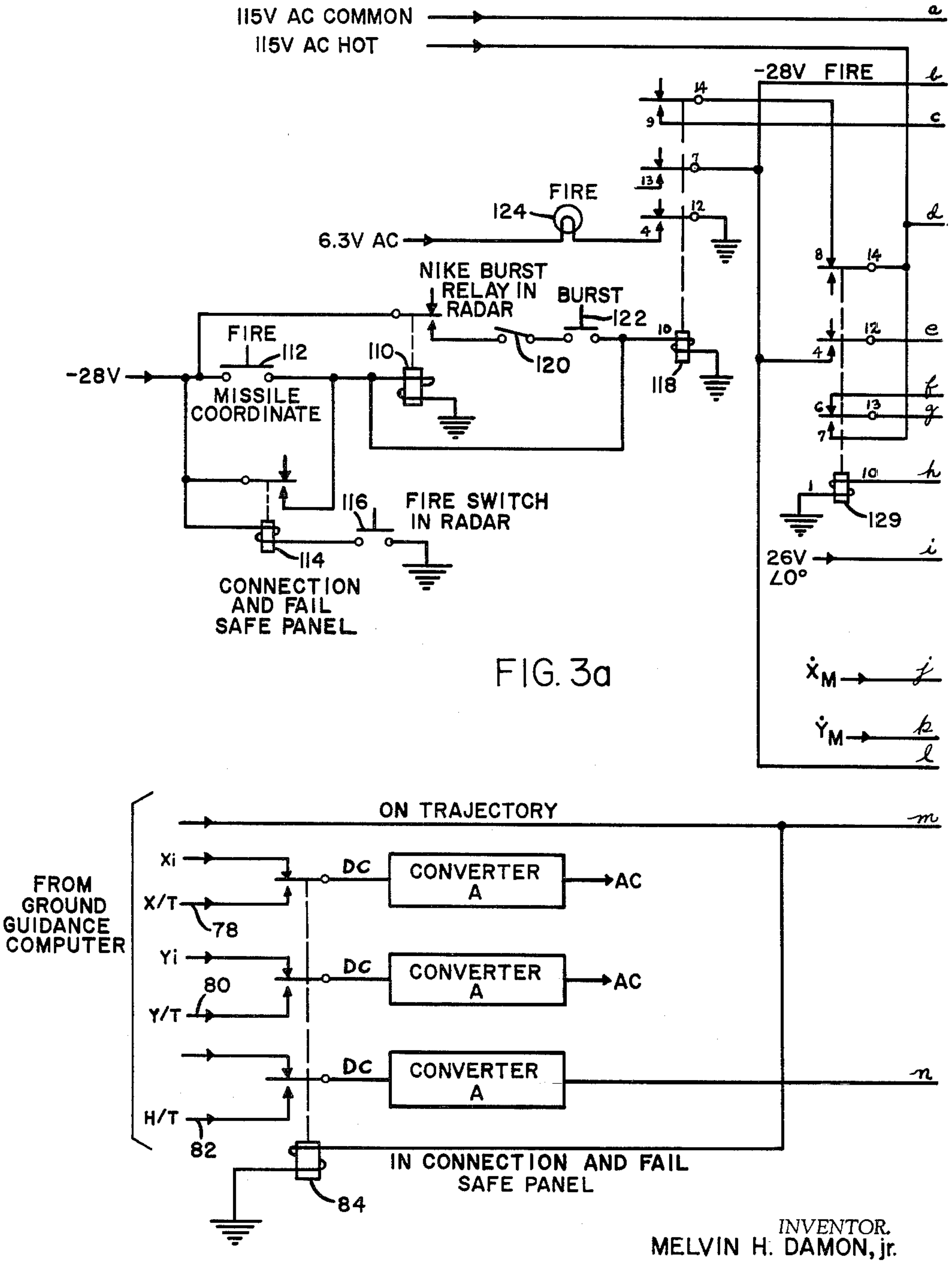
Figure 3B:
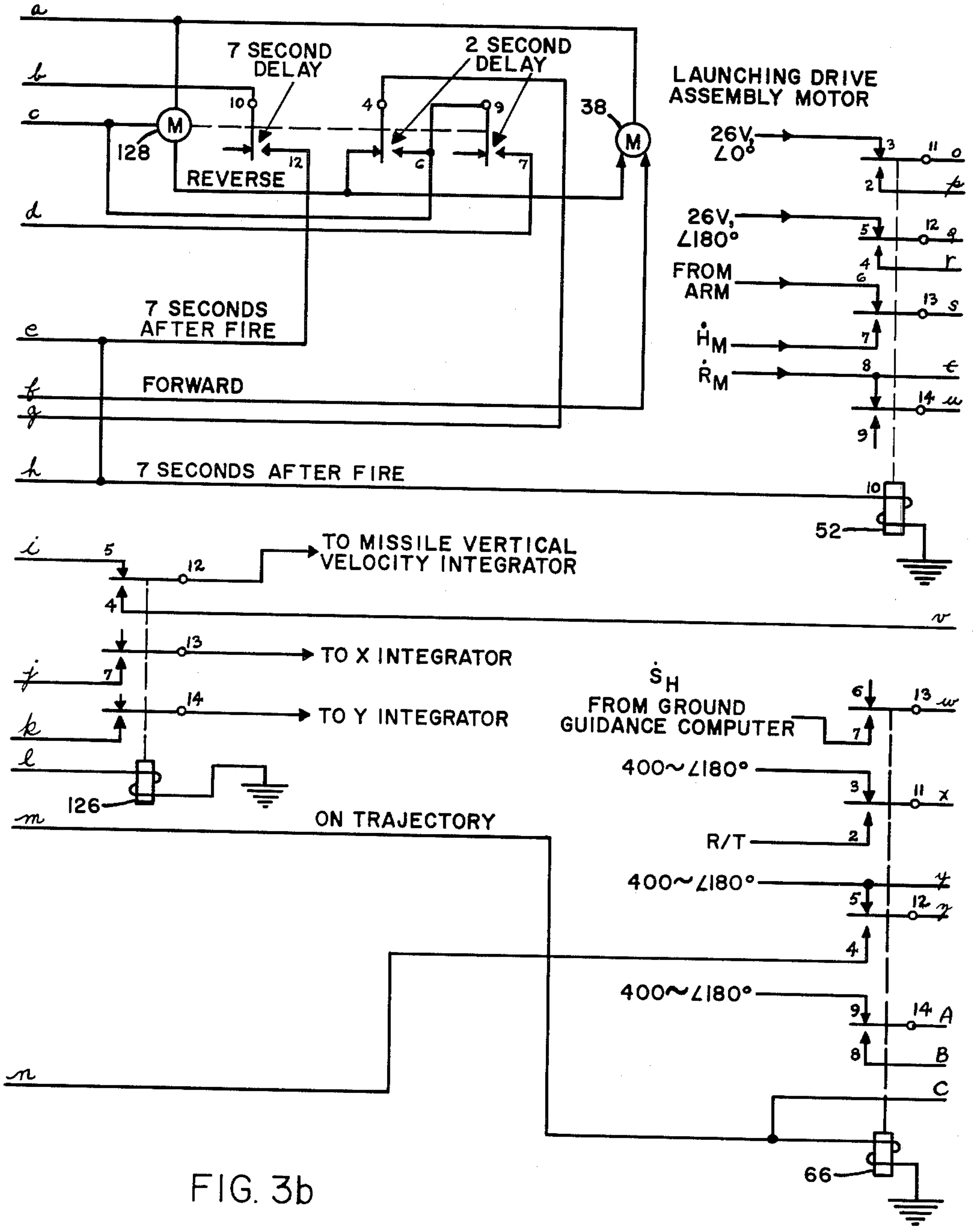
Figure 3C:
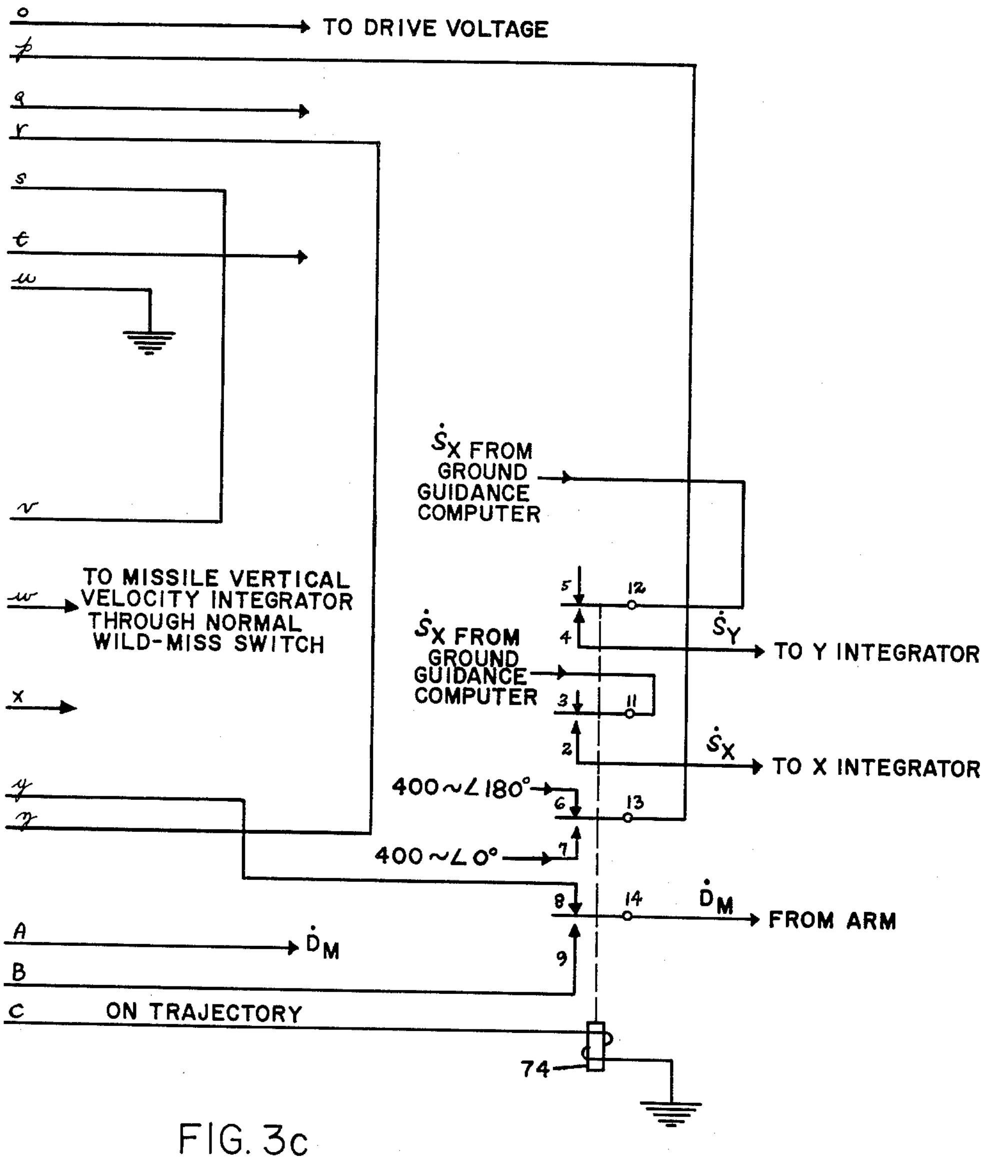
Figure 4:
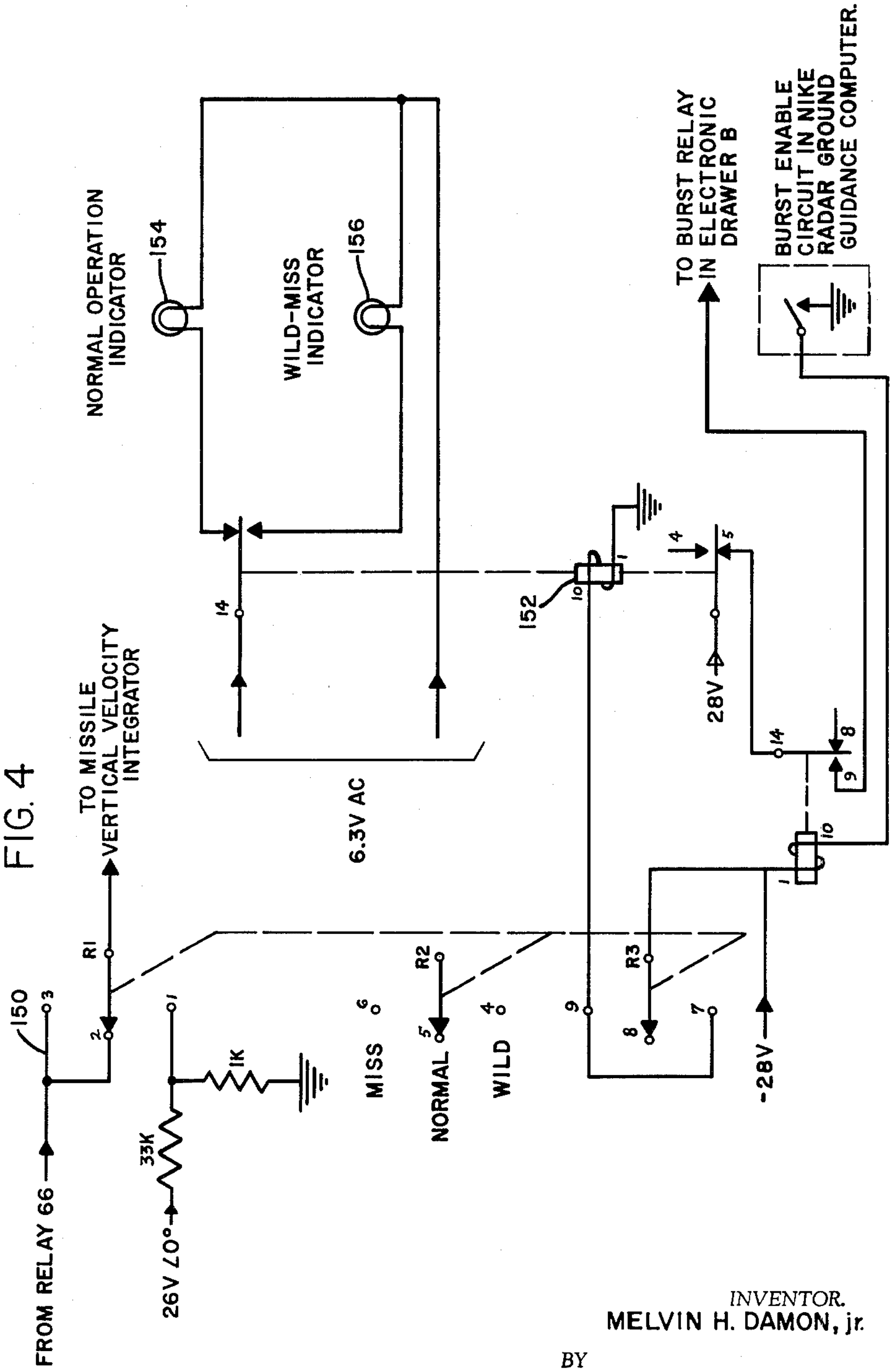
Figure 6A:
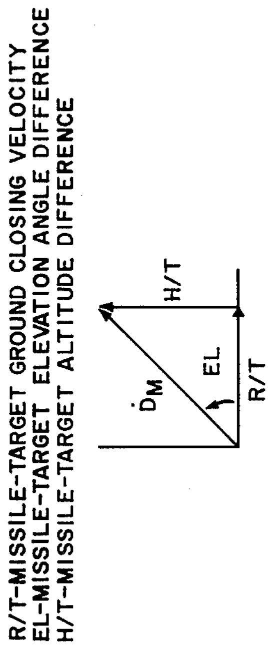
Figure 6B:
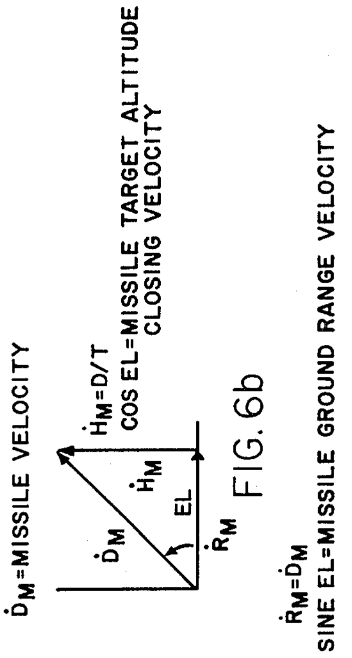
Figure 6:
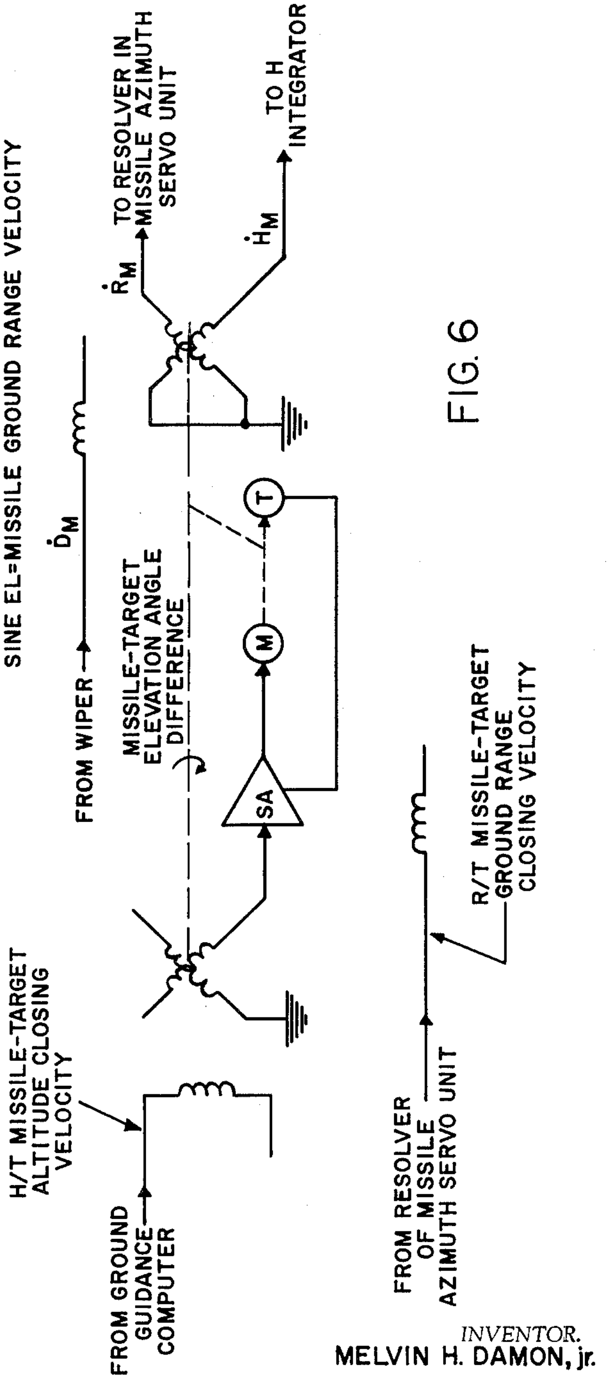

Other objects and many of the attendant advantages of this invention will be readily appreciated as the same becomes better understood by reference to the following detailed description when considered in connection with the accompanying drawings wherein:

FIG. 1 is a simplified block diagram showing the signal flow between the structure of the instant invention (the Nike motion generator and the various other parts of the radar trainer);

FIG. 2*a*–2*c* is a simplified block diagram showing the Nike motion generator servo loops;

FIG. 3*a*–3*c* is a simplified block diagram showing the sequence and timing circuitry of the Nike motion generator;

FIG. 4 is a functional block schematic diagram of the overall missile coordinate generator of the radar simulator which shows the Nike motion generator and the associated circuitry within the radar simulator;

FIG. 5 is a functional diagram of the missile horizontal servo unit; FIG. 5*a* is a vector diagram demonstrating the resolution of azimuth angle AZ in the horizontal servo unit; FIG. 5*b* is a vector diagram demonstrating the resolution of component velocity from the missile ground range velocity; and FIG. 6 is a functional diagram of the missile elevation servo unit; FIG. 6*a* is a vector diagram demonstrating the components necessary to resolve elevation angle EL; and FIG. 6*b* is a vector diagram demonstrating the resolution of missile ground velocity form given vector components.

The function of the Nike motion generator is to generate changing easting, northing, and altitude rectangular coordinate voltages. These aforementioned signals are resolved into polar coordinate voltages in the missile coordinate generator for use in the simulation of a typical Nike trajectory. During normal operation, the simulated missile trajectory as viewed on the indicating devices of the radar simulator is such that the missile kills the simulated target held in track by the Nike radar set. Unlike previously utilized target coordinate generators, the Nike motion generator requires no manual inputs but operates automatically from Nike target positioning data information received from a Nike radar ground guidance computer.

Referring now to FIG. 1, the Nike motion generator 10 obtains input signals from the ground guidance computer 12, which is part of a Nike radar set. The Nike radar set comprises the ground guidance computer 12, the target track radar 14, and the target acquisition radar 16. The radar simulator comprises the Nike motion generator 10, the missile coordinate generator 18, the missile video circuits 20, the device indicators 22, the target video circuits 24, and the target coordinate generators 26. Servo loops in the Nike motion generator, the inputs to which are controlled by relays in the device and the Nike radar set, automatically compute the Nike target positioning data from signals received from the Nike radar ground guidance computer 12 and provide the signals to simulate the missile kill of the simulated target.

After a simulated target is acquired by the Nike target track radar 14, the Nike target track radar locks onto the simulated target. At this time, target azimuth and elevation data 30 are fed to the ground guidance computer 12, which in turn, feeds missile-target data 32 to the Nike motion generator. After launching of a simulated missile, missile coordinate voltages 28 generated in the Nike motion generator 10 are fed to the missile coordinate generator 18 and the Nike radar ground guidance computer 12.

The Nike radar ground guidance computer 12 is capable of computing the time at which a missile is "on trajectory." The "on trajectory" phase of a Nike trajectory is initiated by a respective sequencing signal 34 from the ground guidance computer that controls operation of the Nike motion generator servo loops. During the "on trajectory" phase, any deviation from the missile trajectory required to kill a target is corrected in the Nike motion generator by error signals 36 generated in the ground guidance computer. Simulated Nike missile and target video can be observed on the device acquisition and track indicators 22. Missile video, however, is not presented on indicators of the Nike radar set.

A Nike type missile rises nearly vertically with a constant acceleration during the initial part of its trajectory. Seven seconds after lift-off, the missile receives a dive order. As a result, the missile continues to climb at a lesser vertical angle to an altitude of approximately 30,000 feet unless an "on trajectory" signal is generated in the ground guidance computer 12 of the Nike radar set. In the event that the "on trajectory" signal is not generated when the missile reaches the 30,000 foot altitude, the missile commences to dive. Sometime during this dive the ground guidance computer generates an "on trajectory" signal and as a result the missile receives steering orders which direct the missile to cause target kill. The circuitry of the Nike motion generator is designed to generate coordinate voltages which, when resolved in the missile coordinate generators 18, enter into formation of missile video that simulates the aforedescribed trajectory.

The relays which control the servo loops of the Nike motion generator are shown in FIG. 3*a*, 3*b*, 3*c*. In this figure, the relays are illustrated in their respective prelaunch position. Two seconds after "fire" synchronous motor 38 is energized by power supplied through the Nike motion generator timing circuit, causing motor 38 to turn in the forward direction and drive the arm of resistor 40. The resultant increasing voltage on the arm of resistor 40 is fed through relay 42 to the missile vertical velocity integrator 44, relay 42 being energized at the time of fire. The voltage developed on the arm of resistor 40 corresponds to the initial acceleration of the simulated missile. This velocity when integrated in the missile vertical velocity integrator 44, is formed into A.C. and D.C. voltages representing vertical distance. (The velocity integrator 44 is a conventional A.C. analog computing unit, comprising an electromechanical servo type device that uses a linear tachometer to integrate the input signal as a function of time.) An A.C. vertical distance output voltage 46 from the missile vertical velocity integrator 44 is fed to the missile coordinate generator 18. An equivalent D.C. vertical distance voltage 48 is fed to a Nike radar ground guidance computer 12 to duplicate the almost vertical lift-off of an actual Nike missile. The voltages of the X and Y coordinates are prevented from being generated by the grounding of the missile ground range velocity $\dot{R}_M$, 50, through contacts 8 and 14 of relay 52. During this time the shaft of resolver 54 the missile vertical servo unit 79 is positioned by fixed voltage 56 fed through contacts 5 and 12 of relay 52 to maintain proper elevation angle of the missile X*i* and Y*i*, respectively 58 and 60, which are ideal closing velocities, are fed simultaneously from the ground guidance computer 12 to resolver 62 in the missile horizontal servo unit 64. These X*i* and Y*i* voltages, 58 and 60, position the azimuth angle shaft of servo unit 62, thus making it possible to have the missile dive in the correct azimuth direction. That is, the predicted direction that leads to the intercept point of the target and missile.

Seven seconds after Nike motion lift-off, the simulated missile performs a 7G dive. This is accomplished by the closing of relay 52 caused by application of energizing voltage from the Nike motion generator timing circuit. Reduction in upward velocity to simulate the action of a dive order is caused by the application of a fixed A.C. voltage through contacts 8 and 14 of relay 66 and the removal of the ground from terminal 8 of relay 52. The fixed A.C. voltage is a signal from a 400 cycle A.C. signal source, scale factored in amplitude to represent the appropriate velocity component. This fixed A.C. voltage is now fed to resolver 68 in the missile altitude vertical velocity replacing the initial upward velocity previously fed to the missile vertical velocity integrator from the arm of resistor 40. The simultaneous removal of the ground on $\dot{R}_M$, 50, allows for the generation of $\dot{X}$ and $\dot{Y}$ ground coordinates 70 and 72 respectively, so that the missile trajectory levels off. At seven seconds after lift-off, a fixed A.C. voltage applied through terminals 6 and 13 of relay 74 and terminals 2 and 11 of relay 52, drives resistor 76. If no "on trajectory" signal is received from ground guidance computer 12, the output from the arm of resistor 76 fed through terminals 14 and 8 of relay 74, terminals 5 and 12 of relay 66, terminals 4 and 12 of relay 52 to resolver 54 causes the elevation angle shaft of the missile vertical servo unit 78 to turn slowly until rollover occurs at approximately 20 seconds after fire at an altitude of approximately 30,000 feet. At this altitude, the output of resolver 68 causes the missile vertical velocity integrator to reverse direction so that a decreasing output voltage from this integrator causes the missile to dive. During simulated rollover maneuver, which lasts 2–3 seconds, rollover damping voltage is fed to resolver 54 through terminals 3 and 11 of relay 66. Rollover occurs some 20 seconds after fire.

The "ground guidance computer" (GGC) is an integral part of the M-33 Nike Tracking Radar with which the Nike Motion Generator is designed to operate. In this simulation mode, the Nike Motion Generator is part of a closed loop system to simulate missile motion, and as such receives signals generated by the GGC, and provides signals to the display systems indicative of missile motion. Such signals as indicated, X, Y, $\dot{S}_H$, $\dot{S}_X$, $\dot{S}_Y$ are scale factor analog computational signals representing the parameter values, and are generated by conventional computer generating means.

Proper azimuth direction of dive is determined by X*i* and Y*i* intercept coordinate voltages 58 and 60 fed from the ground guidance computer 12 to resolver 62 in the missile horizontal servo unit 64. X*i* and Y*i* intercept coordinate voltages 58 and 60 are fed to the stators of resolver 62 and serve to position the azimuth angle shaft of the missile horizontal servo unit 64. Ground coordinate velocities $\dot{X}_M$ and $\dot{Y}_M$, 70 and 72 respectively, formed in resolver 77 of the horizontal servo unit 64, are integrated into distances by respective ground velocity integrators. X*i* and Y*i* voltages, 58 and 60, from the ground guidance computer 12 thus serve to position the simulated missile. The same is true for *X/T*, *Y/T*, and *H/T* voltages, 78, 80 and 82 respectively, fed from the ground guidance computer 12 during the steering phase of the simulated missile.

The steering phase of the simulated missile commences when an "on trajectory" signal is received from the ground guidance computer and can occur any time during the dive of the missile as explained above. The "on trajectory" signal energizes relay 84 and relays 74 and 66 in the Nike motion generator. As a result, closing velocities *X/T*, *Y/T*, and *H/T*, respectively 78, 80 and 82, and correcting voltages $\dot{S}_H$, $\dot{S}_X$ and $\dot{S}_Y$, respectively 86, 88 and 90 from the ground guidance computer as well as missile velocity from the arm of resistor 76 drive the simulated missile to intercept the simulated target.

The *X/T* and *Y/T* closing velocities 78 and 80 are vectorially combined in resolver 62 of the missile horizontal servo unit with ground range closing velocity *R/T*, 92, formed on one rotor winding of resolver 54. The missile-target azimuth projected on the ground plane appears on the common load shaft of resolvers 62 and 77. Ground range closing velocity, *R/T*, 92 from resolver 62 and missile target altitude closing velocity, *H/T*, 82, from the ground guidance computer 12 are fed to respective stator windings of resolver 54 of the missile vertical servo unit 79 to form missile target elevation angle. Missile velocity $\dot{D}_M$ from the arm of resistor 76 is applied to one stator of resolver 68 through relay 66.

The arm of resistor 76 is set to ground by means of a signal fed through contacts 3 and 11 of relay 52 at time of fire. At seven seconds after lift-off, resistor 76 is driven by feeding a fixed A.C. input voltage to amplifier 98 through terminals 2 and 11 of relay 52. This input voltage causes the generation of signals which simulate the missile's rise to an altitude of 30,000 feet and rollover (dive) as explained above. When an "on trajectory" signal energizes relay 74, a fixed voltage of opposite phase feeds through contacts 7 and 13 of relay 74 and contacts 2 and 11 of relay 52 and causes the arm of resistor 76 to be driven in the opposite direction so that a decreasing altitude velocity is formed at the arm of resistor 76 and fed to resolver 68.

Since the rotor position of resolver 68 represents the missile-target elevation angle, the output of one rotor winding of resolver 68 is $\dot{H}_M$ (missile-target altitude closing velocity). The output of the second rotor winding is $\dot{R}_M$ 50 (missile-target ground range closing velocity) in the elevation plane. $\dot{H}_M$ is summed with $\dot{S}_H$ 86 (altitude error voltage from the ground guidance computer) and integrated in the H integrator 44 to give total missile altitude with respect to time. A D.C. voltage output from the H integrator is proportional to the altitude coordinate and is fed back to the ground guidance computer 12. An A.C. equivalent is fed to the missile coordinate generator 18.

The missile-target ground range closing velocity $\dot{R}_M$ 50 generated in resolver 68 is fed to the rotor of resolver 77 in the missile horizontal servo unit 64. The rotor of resolver 77 is mechanically coupled to the shaft of the azimuth servo unit 62. $\dot{R}_M$, 50, is resolved in resolver 77 into $\dot{X}_M$, 70 (missile easting velocity), and $\dot{Y}_M$, 72, (missile northing velocity), which are missile velocity components on the ground plane. These components are summed with their respective error velocities, $\dot{S}_X$ and $\dot{S}_Y$, 88 and 90 respectively, and integrated to form missile ground coordinates $X_M$ and $Y_M$. Respective integrators deliver D.C. coordinate voltages to the ground computer 12 and A.C. missile coordinate voltages to the missile coordinate generator 18.

*Timing and sequencing circuit*

Fire control relay 110 is energized when fire switch 112 is closed. Operation of the fire switch 112 energizes relay 110 through contacts 8 and 5 or relay 114. Relay 114 is energized when the radar fire switch 116 is closed. The closing of fire relay 110, in turn, energizes relay 118 in the Nike motion generator to initiate missile trajectory.

Relay 118 in the Nike motion generator and relay 110 remain energized provided the Nike burst relay 120 in the radar and the burst switch 122 remain closed. Opening of either of these components not only de-energizes fire relay 110 and relay 118, but also recycles the Nike ground guidance computer 12. Closing of relay 118 energizes fire indicator lamp 124 and relay 126. Closing of relay 118 also supplies power to timer motor 128, which, in turn, drives a cam that causes motor 38 of the launching drive assembly to turn in the forward direction after a two-second delay. Motor 38 drives resistor 40 to form an upward acceleration voltage. The two-second delay is present to simulate an actual Nike missile, which does not lift off its respective launching pad until two seconds after a fire command is given. The closing of relay 126 at the time of fire completes input circuits to respective integrators in the Nike motion generator.

After a seven-second delay, the cam in the Nike motion generator timer couples 28 volts to relay 129. Closing of relay 129 reverses the A.C. input to drive motor 38 to drive the associated upward velocity potentiometer back to ground. Since the closing of relay 52 also occurs seven seconds after fire, the arm of the upward velocity potentiometer is decoupled from the H integrator and the reverse action of motor 38 does not affect missile trajectory. Instead, relay 52 couples a fixed reference voltage to amplifier 98 to drive the arm of resistor 76, couples a fixed A.C. voltage to resolver 54 and couples $\dot{H}_M$ from resolver 68 to the H integrator 44 via contacts of relays 52 and 42 and removes the ground on $\dot{R}_M$ via relay 52. As previously explained, this action allows the Nike motion generator to form a missile trajectory that levels out to simulate a dive order which would be received by a missile at this time. The "on trajectory" signal from the Nike radar ground guidance computer closes relay 84 and relays 74 and 66 in the Nike motion generator. Closing of relay 84 couples closing velocity voltages to the respective resolvers with altitude velocity $H/T$ coupled to resolver 54 in the missile vertical servo unit through contacts of relays 66 and 52. Closing of relay 66 replaces a fixed reference voltage previously coupled to resolver 54 with ground range velocity $R/T$ generated in resolver 62 of the missile horizontal servo unit. Relay 66 at "on trajectory" time also couples altitude velocity correction $\dot{S}_H$ 86 from the ground guidance computer 12 to the missile vertical velocity integrator 44 through the normal-wild-miss circuit which is explained below.

The closing of relay 74 at "on trajectory" time allows for the coupling of missile velocity $\dot{D}_M$ 130 from the arm of the resistor 76 in the missile vertical servo unit to resolver 68 in the missile vertical servo unit through contacts 9 and 14 of the relay 66 to replace a fixed A.C. reference voltage. To simulate the diving to a target, the phase of the reference voltage fed to resolver 68 in the missile vertical servo unit is reversed when relay 74 is energized. In addition, $\dot{S}_X$ and $\dot{S}_Y$, respectively 88 and 90, azimuth correction velocities from the Nike radar ground guidance computer 12 are coupled to respective integrators to insure coincidence of missile and target.

The opening of the Nike burst relay 120 or burst switch 122 de-energizes relays 118 and 110 and causes the recycling of the Nike motion generator computer so that all relays in the Nike motion generator are returned to their original prefire position.

*Normal-wild-miss circuit*

The normal-wild-miss circuit performs the following: it serves to give an indication of the operational mode of the Nike motion generator; it switches signals to make possible the generation of a wild or miss missile; and it allows for the generation of target video burst effects in the event of target kill only during the generation of a normal Nike missile trajectory. When switch 150 is in the normal position, relay 152 is de-energized and normal operation indicator 154 is energized. If switch 150 is in the miss or wild position, −28 volts, closes relay 152 to energize wild-miss indicator 156. The normal position switch 150 allows error correction voltage $\dot{S}_H$ originating in the Nike ground guidance computer 12 to be fed to the missile vertical velocity integrator 44 during the steering phase of the Nike motion generator. However, when switch 150 is in the wild position and relay 152 is energized, error correction voltage $\dot{S}_H$ is replaced with a constant reference voltage so that the Nike motion generator cannot correct for altitude errors.

Thus, by the use of simplified electronic circuitry, the instant invention produces electronic signals which are simulative of a Nike trajectory and simulates Nike missile hits on a target.

Obviously many modifications and variations of the present invention are possible in the light of the above teachings. It is therefore to be understood that within the scope of the appended claims the invention may be practiced otherwise than as specifically described.

What is claimed is:

1. A device for training personnel in the operation of airborne self-propelled missiles comprising:
 means for generating signals simulative of the vertical motion of a missile,
 means for generating signals simulative of the horizontal motion of a missile,
 timing circuits, said timing circuits being coupled to said vertical and horizontal signal generating means for control thereof,
 means for generating signals representative of missile velocity comprising:
 a first motor means,
 a second motor means,
 relay means, said relay means being interconnected between said first and second motor means,
 and a source of operating voltage, said source of operating voltage being connected to said first and second motor means for operation thereof whereby said first and second motor means in combination with said relay means produce signals at certain specified intervals to simulate the operation and velocity of a missile,
 said missile velocity signal generating means being coupled to said vertical and horizontal signal generating means for control thereof,
 integrating means, said integrating means being coupled to said vertical and horizontal signal generating means for conversion of said vertical and horizontal missile motion signals to missile position signals, first control means, said first control means being operatively connected to said first motor means whereby said first motor means operates at a speed to produce a time delay of two seconds, and second control means, said second control means being operatively connected to said second motor means whereby said second motor means produces a time delay of seven seconds.

2. The combination of claim 1 and a first signal converter means, a second signal converter means, and relay means, said relay means being interconnected between said first signal converter means and said integrator, whereby output signals from said vertical and horizontal signal generating means are integrated and converted by said velocity integrator to position signals representative of the missile position.

3. The combination of claim 2 wherein said vertical signal generating means is a servo mechanism which comprises:

a servo amplifier, a motor-generator, and a potentiometer, the output of said operational amplifier being connected to said motor-generator and the output of said motor-generator being connected to said potentiometer whereby said potentiometer generates output signals in accordance with input signals, feedback means connected from said generator output to the input of said operational amplifier for control of the characteristics of said servomechanism, and resolver means, said resolver means being operatively connected to the output of said generator means for resolving the output of said generator means into vertical velocity signals.

4. The combination of claim 3 wherein said horizontal signal generating means comprise resolver means whereby input signals to said horizontal signal generating means are resolved into horizontal velocity signals.

References Cited by the Examiner

FOREIGN PATENTS 897,753 5/1962 Great Britain.

CHESTER L. JUSTUS, *Primary Examiner.*

MAYNARD R. WILBUR, *Examiner.*